United States Patent [19]
Momose et al.

[11] Patent Number: 5,135,314
[45] Date of Patent: Aug. 4, 1992

[54] CERAMIC BEARING

[75] Inventors: Terunobu Momose, Mizunami; Tetsuo Shibata, both of Mizunami, Japan

[73] Assignee: Wing Highcera Co. Ltd., Japan

[21] Appl. No.: 716,955

[22] Filed: Jun. 18, 1991

Related U.S. Application Data

[63] Continuation of Ser. No. 589,180, Sep. 27, 1990.

[30] Foreign Application Priority Data

Oct. 2, 1989 [JP] Japan .................. 1-255191
Oct. 9, 1989 [JP] Japan .................. 1-262084

[51] Int. Cl.$^5$ .............................................. F16C 17/10
[52] U.S. Cl. .................................. 384/275; 384/420; 384/907.1
[58] Field of Search ............... 384/275, 280, 281, 296, 384/297, 907.1, 913, 420

[56] References Cited

FOREIGN PATENT DOCUMENTS 308217 12/1988 Japan .

*Primary Examiner*—Lenard A. Footland
*Attorney, Agent, or Firm*—Eckert Seamans Cherin & Mellott

[57] ABSTRACT

This invention is to provide a ceramic sliding bearing which is possible to support the axis to which the radial load and the thrust load are applied simultaneously or selectively, and also this invention is to provide a bearing having a small number of parts by constructing the inner and the outer rings by means of ceramics.

The ceramic product of this invention is characterized by combination of the ceramic inner ring and the ceramic outer ring wherein said ceramic inner ring which forms an axial hole for engaging the axis at the center thereof, forms a cylinder surface parallel to the axial center of the axial hole on the outer periphery thereof and forms an approximately rectangular plane to the axial hole at the end portion thereof, and said ceramic outer ring having a cylindrical surface at the inner periphery which contacts slidably with the outer periphery of the ceramic inner ring and a plane which contacts slidably with a plane formed at the end portion of the ceramic inner ring connecting with said cylindrical surface.

3 Claims, 3 Drawing Sheets

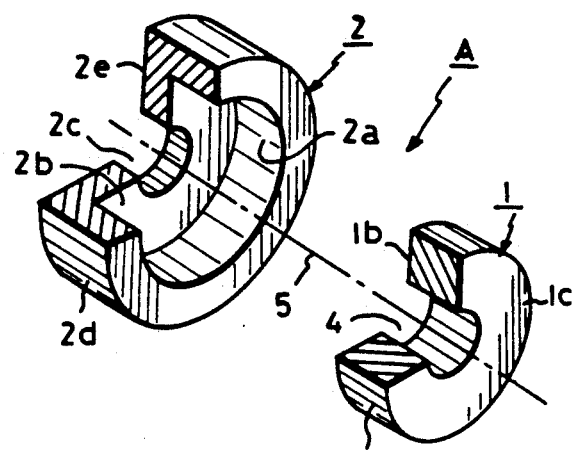
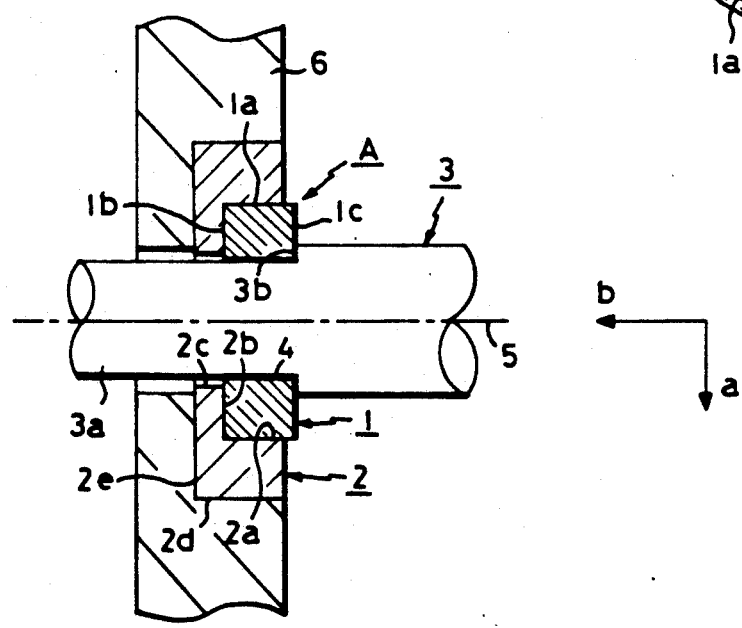

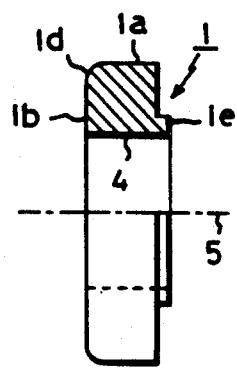
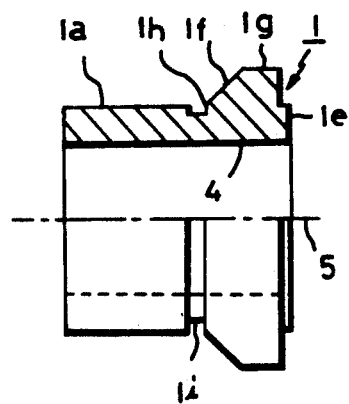
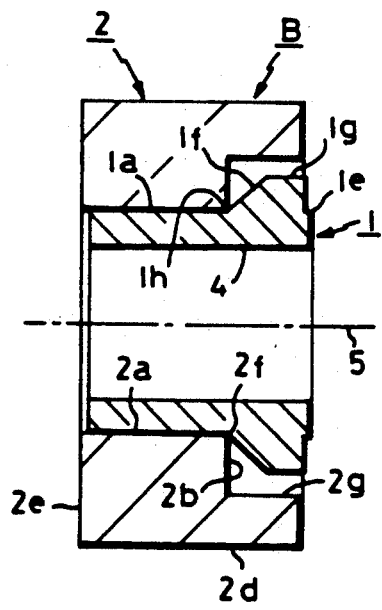
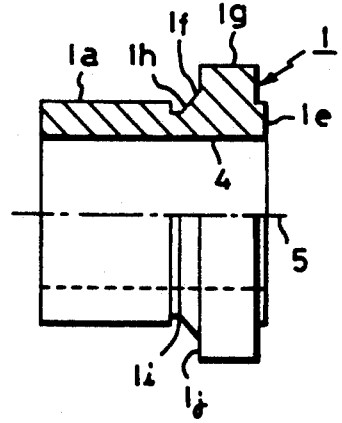

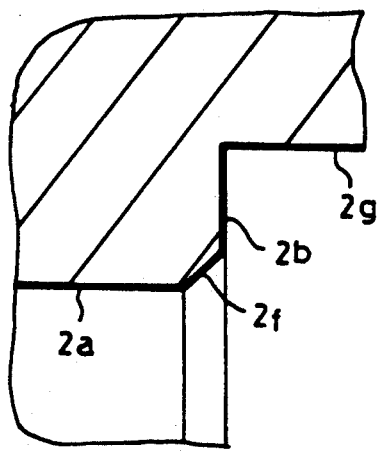
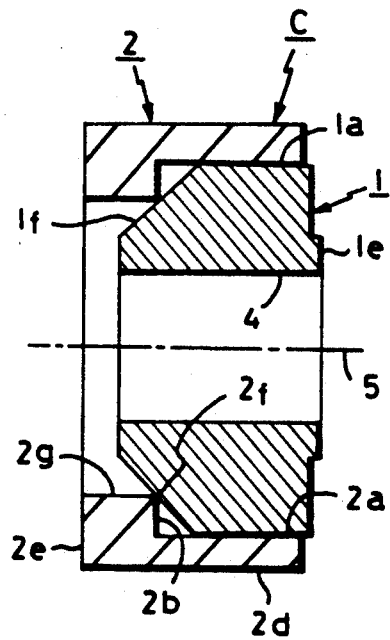

CERAMIC BEARING

FIELD OF THE INVENTION

This invention relates to a ceramic bearing which is possible to support an axis to which a thrust load and a radial load are applied simultaneously or selectively.

DESCRIPTON OF THE PRIOR ART

It is general to use a sliding bearing or a rolling bearing at the time of attaching a rotary axis to a machine frame, etc.

As the rolling bearing, there are kinds of ball bearings, roller bearing and needle bearing, etc. provided with a rolling member such as balls, rollers, and needles etc. between an inner ring and an outer ring and further kinds of radial bearing and thrust bearing, etc. according to a supporting system of a load applies to an axis engaged with the inner ring. A deep-groove type bearing, an angular type bearing, and a taper roller bearing, etc. are known as bearings which can support an axis to which a radial load and a thrust load are applied simultaneously. These rolling bearings are used by selecting the most propriate one at the time of design of a machine because various kinds of products are standardized.

As the sliding bearings, they are made or constructed of a metal supporter made of steel, cast iron, copper and the like laminated a white metal layer thereon or laminated an oil including alloy or embed it thereon. Further, some sliding bearings are made or constructed by gun metal, synthetic resin and the like formed to a sleeve shape. Generally, in conventional sliding bearings, bearings which support the radial load and the bearings which supports thrust load are separately standardized.

The above rolling bearing and the sliding bearing have peculiar characteristics respectively. Accordingly, in employment the most suitable one is used considering these characteristics.

On the other hand, recently ceramics having high compression strength and friction resistance and small friction coefficient have been developed. This applicant has developed several kinds of ceramic bearings and already filed patent applications (Japenese Patent application No. 63-325933, etc.).

However, even the above rolling bearings and sliding bearings have troublesome.

Namely, in the rolling bearing phonomenon due to rolling fatigues happens which determines its life necessarily. By this, because the thermal resistance is low and the number of constructing parts thereof increases, the cost of the product becomes high.

Further, in the above sliding bearing the friction loss increases due to the sliding contact of the outer periphery of the axis with inner periphery. By this, there occurs such problem as necessity of applying a reinforced lubrication or a self lubrication to the contact surface of the axis with the bearing. In addition, when a radial load and a thrust load are applied to the axis simultaneously, it occurs such problems as combination of a market radial bearing and a market thrust bearing in use or a necessity of a new design in each time of use.

Further, a prior art disclosed in U. S. Pat. No. 4,634,300 relates to a rolling bearing constructed by using a ceramic roller as a rolling body. According to this technique, it is possible to constitute a rolling bearing a heat resistance and an anti-corrosion, but this technique increases number of parts products which constitutes the bearings.

SUMMARY OF THE INVENTION

The main object of this invention is to provide a ceramic sliding bearing which is possible to support the axis to which the radial load and the thrust load are applied simultaneously or selectively.

Another object of this invention is to provide a bearing having a small number of parts by constructing the inner and the outer rings by means of ceramics.

Accordingly, in order to attain these objects the ceramic product of this invention is characterized by combination of the ceramic inner ring and the ceramic outer ring wherein said ceramic inner ring which forms an axial hole for engaging the axis at the center thereof, forms a cylinder surface parallel to the axial center of the axial hole on the outer periphery thereof and forms an approximately rectangular plane to the axial hole at the end portion thereof, and said ceramic outer ring having a cylindrical surface at the inner periphery which contacts slidably with the outer periphery of the ceramic inner ring and a plane which contacts slidably with a plant formed at the end portion of the ceramic inner ring connecting with said cylindrical surface.

Other ceramic bearing is characterized by the combination of the ceramic inner ring and the outer ring wherein said inner ring comprises an axial hole for engaging the axis at the center thereof, a cylindrical surface parallel to the axial center of the axial hole on the outer periphery thereof and a taper surface connected with the cylindrical surface, and said outer ring comprises a cylindrical surface which contacts slidably with the cylindrical surface formed on the outer periphery of the ceramic inner ring and the sliding surface which contacts slidably with a part of the taper surface at the ceramic inner ring.

As described above, since this invention is constructed by the combination of the inner ring and the outer ring wherein said ceramics inner ring (hereinafter referred to as "inner ring") comprises the axial hole for engaging the axis at the center thereof, a cylindrical surface parallel to the axial center of the axial hole on the outer periphery of the inner ring and a plane to approximately rectangular to the axial center of the axial hole at the end portion thereof, and said ceramic outer ring (hereinafter referred to as "outer ring") comprises a cylindrical surface with contacts slidably with the cylindrical surface formed on the outer periphery of the inner ring and a plane which contacts slidably with a plane formed at the end portion of the inner ring connecting with this cylindrical surface, when the axis to which a radial load and a thrust load are applied simultaneously or selectively, is allowed to engaged with the axial hole of the inner ring, the radial load is supported by the cylindrical surface formed at the inner ring and the outer ring, while the thrust load is also can be supported by the plane formed at the inner ring and the outer ring.

In addition, when the bearing is constructed by the combination of these inner and outer rings by forming the taper surface connecting with the cylindrical surface formed at the inner ring and forming the sliding surface contacts with a part of the taper surface at the outer ring, the radial load can be supported by the cylindrical surface formed at the inner and outer rings and the thrust load applied to the axis also can be suppported by allowing to contact the sliding surface formed at the outer ring with a part of the taper surface formed at the inner ring.

Further, since the bearing is constructed by the inner and outer rings, the number of parts decrease as compared with the conventional rolling bearing, thereby decreasing the cost thereof.

Furthermore, since the axis is engaged with the axial hole formed at the inner ring, the sliding does not happen between the axis and the inner ring. Accordingly, there is no fear of occurrence of the abrasion to the axis even after long period of use.

Since the inner and outer rings are constructed by ceramics, the sliding friction is small thereby being able to decrease the heat generation due to the friction. Further, since the expansion due to the heat is small, the generation of stress regarding a machine frame and axis, etc. is possible to decrease.

BRIEF DESCRIPTION OF THE DRAWINGS

FIG. 1 is a developed explanatory view of a first embodiment of this invention.

FIG. 2 is an explanatory view of a using state of the bearing in the first embodiment of this invention.

FIG. 3 is an explanatory of the inner ring of the first embodiment. The bearing can be disassembled by relative axial displacement of the outer ring 2 beyond an end of the inner ring 1.

FIG. 4 is an assembling explanatory view of the bearing in a second embodiment of this invention.

FIG. 5 is an explanatory view of the inner ring of the second example.

FIG. 6 is an explanatory view of another embodiment of the inner ring in the second embodiment.

FIG. 7 is an explanatory view of a material portion of the outer ring in the second embodiment.

FIG. 8 is an assembling explanatory view of the bearing in another embodiment of this invention.

DETAILED DESCRIPTION OF THE PREFERRED EMBODIMENT

EXAMPLE 1

In FIGS. 1 and 2, the bearing A is constructed by combination of the inner ring 1 and the outer ring 2.

The inner ring 1 is formed by filling an oxide ceramics material such as PSZ (partially stabilized zirconia) or alumina, etc. in a mold to press to form and sintering a pressed product 1500° C.–1600° C.

At the center of the inner ring 1, an axial hole 4 for engaging the axis 3 is formed. The axial hole 4 is formed so as to have a fixed engaging allowance according to the diameter of the axis 3 to engage with the axial hole 4.

Further, the numeral 5 is an axial center of the axial hole, said axial center corresponding to the axial center of the bearing A.

On the outer periphery of the inner ring 1, the cylindrical surface 1a parallel to the axial center 5 is formed. This cylindrical surface 1a contacts slidably with the cylindrical surface 2a formed at the outer ring 2 described hereinafter whereby the radial load applied to the axis 3 is transmitted to the outer ring 2. For this purpose, it is necessary that the cylindrical surface 1a is correctly parallel to the axial center 5. Further, the diameter of the cylindrical surface 1a is designed to be a dimension having a sufficient rigidity of the inner ring 1 according to the radial load to be supported by the bearing A and the length of the inner ring 1 is also designed according to the thrust load to be supported by the bearing A as same as in case of the radial load.

At the end surface of the front side (left side of the Figure, the same hereinafter) of the inner ring 1, a plane 1b approximately rectangular to the axial center 5 is formed. The plane 1b contacts slidably with the plane 2b formed at the outer ring 2 to transmit the thrust load applied to the axis 3 to the outer ring 2. The end surface of the rear side (right side of the Figure, the same hereinafter) of the inner ring 1 is formed to be an approximately rectangular plane with respect to the axial center 5 as same as in plane 1b as an about surface 1c against which abuts a step portion 3b of a journal portion 3a formed at the axis 3.

The outer ring 2 is formed, by press-forming after filling an oxide ceramics material such PSZ or alumina, etc. in a mold as same as in the inner ring and sintering thus formed product at 1500° C. to 1600° C.

At the inner of the outer ring 2, is formed a cylindrical plane 2a having a fixed allowance relative to a cylindrical plane 1a formed on the outer periphery of the inner ring 1. The cylindrical surface 2a contacts slidably with the cylindrical surface 1a of the inner ring 1 and the radial load applied to the axis 3 is transmitted through the inner ring 1 thereto. For this purpose, the cylindrical surface 2a is constructed by a plane parallel to the axial center 5.

At the inner of the outer ring 2, the plane 2b is formed in approximately rectangular direction with respect to the cylindrical surface 2a connecting therewith, or at right angle with respect to the axial center 5.

This plane 2b contacts slidably with the plane 1b formed at the inner ring 1 and is transmitted the thrust load applied to the axis 3 through the inner ring 1.

At the center of the outer ring 2, the hole 2c is formed connecting with the plane 2b. The hole 2c is formed with a diameter which is possible to loosely insert the axis 3 engaged with the axial hole 4 of the inner ring 1.

The outer periphery 2d of the outer ring 2 is formed cylindrically parallel to the axial center 5. The end surface 2e of the hole 2c side of the outer ring 2 is constructed as a plane formed at right angle with the axial center 5. The outer periphery 2d and plane 2e becomes an engaged portion at the time of attaching the bearing A to the machine frame 6 or a casing not illustrated.

The axial hole 4, the cylindrical surface 1a, and the plane 1b, in the inner ring 1 and the cylindrical surface 2a, the plane 2b, the hole 2c, the outer periphery 2d and the end plane 2e in the outer ring 2 are formed at the time of press-forming simultaneously.

In the above forming, the dimension accuracy regarding the inner ring 1 and the outer ring 2 can be obtained by the accuracy of about design dimension ±0.005 mm of each part. Further, the surface roughness can be obtained by accuracy of about RA0. A.

In order to construct the bearing by the inner ring 1 and the outer ring 2 constructed as above, the cylindrical surface 1a and the plane 1b of the inner ring 1 are engaged with a concave portion comprising the plane 2b connecting with cylindrical surface 2a and the cylindrical surface 2a formed at the outer ring 2. By this, by contacting slidably the cylindrical surfaces 1a, 2a with the planes 1b, 2b respectively, the axis 3 engaged with the inner ring 1 can be supported.

It is desirable to perform a grinding to the cylindrical surface 1a of the inner ring 1, cylindrical surface 2a of the outer ring 2 and the surface of the outer periphery 2d, etc. which construct the bearing A respectively and separately according to the accuracy requested for the bearing A.

It is desirable to lap each contact surface which constructed by cylindrical surfaces 2a, 1a and planes 2b, 1b after engaging the inner ring 1 with outer ring 2. The lapping can be practiced by providing a grinding agent such as diamond powders, etc. to each contact surface and preforming a relative rotation between inner ring 1 and outer ring 2.

The bearing A can be allowed to rotate more smoothly by grinding or lapping the inner ring 1 and outer ring 2 respectively.

A case where the axis 3 is supported by the bearing A constructed as above will be described with reference to FIG. 2.

In FIG. 2, the outer ring 2 which constructs the bearing A is attached to the machine frame 6 inrotatively. At the axial hole 4 of the inner ring 1, the journal portion 3a of the axis 3 is engaged thereto and the step portion 3b of the axis 3 is caused to abut against the abut surface 1c of the inner ring 1.

If suppose that the radial load in a direction shown by arrow and the thrust load in b direction shown by arrow apply to the axis 3 simultaneously, the radial load is transmitted to the inner ring 1 from the journal portion 3a and transmitted to the outer ring 2 by way of the cylindrical surfaces 1a and 2a. Further, it is transmitted to the machine frame 6 thereby being supported by frame 6. The thrust load is transmitted to the inner ring 1 through the abut surface 1c of the inner ring 1 from the step portion 3b of the axis 3, and transmitted to the outer ring 2 through the planes 1b and 2b. Further, it is transmitted to the machine frame 6 from the plane 2b of the outer ring 2 thereby being supported by frame 6.

Thus, the bearing A according to this invention is possible to support the axis 3 to which the radial load and the thrust load apply simultaneously or selectively with smooth by constructing the cylindrical surfaces 1a, 2a formed parallel to the axial center 5 and the planes 1b, 2b formed in approximately rectangular direction against the axial center 5 so that both may contact slidably each other.

In the bearing A, it is possible to design a dimension of the inner ring 1, namely the diameter and the length of the cylindrical surface 1a according to the radial load and the thrust load applied to the ring 3. Accordingly, when the radial load applied to the axis 3 is large, the rigidity of the inner ring can be increased by enlarging the diameter of the inner ring 1. However, if the diameter of the inner ring 1 is enlarged, the contact area of the plane 1b and plane 2b become larger whereby a circular velocity of the contact surface becomes different according to a position in a radius direction of the surface whereby friction loss increases. In order to decrease the friction loss, it is desirable to form a beveling portion 1d having a comparatively large dimension as shown in FIG. 3 at a ridged line where the cylindrical surface 1a and the plane 1b of the inner ring 1 are connected.

By forming the beveling portion 1d at the inner ring 1, it is possible to lessen the contact area of the cylindrical surfaces 1a, 2a with the surfaces 1b and 2b together with increasing the rigidity of the inner ring 1. In other words, it is possible to lessen the friction loss in the planes 1b and 2b by decreasing the area where the radial load and thrust load are applied.

As described above, although surface area in the contact area becomes high by lessening the contact area the cylindrical surfaces 1a and 2a with the planes 1b and 2b, these are sufficiently pressure resistant because the inner ring 1 and the outer ring 2 are made by ceramics.

Further, it is possible to engage the inner ring 1 smoothly to a concave constructed by the cylindrical surface 2a formed at the outer ring 2 and the plane 2b connected with the cylindrical surface 2a by forming the beveling portion 1d at the inner ring 1.

It is possible to form steps having a very small height at the end surface of the rear side of the inner ring 1 and to construct the surface of the step as a abut surface 1e as described above. Further, by constructing the abut surface 1e as described above, the accuracy of the right angle respect to the axial center 5 of the surface 1e can be increased. Furthermore, by forming the abut portion 1e at the inner ring 1, even if the journal portion 3a of the axis 3 are engaged with the axial hole 4 of the ring 1 and the step portion 3b is allowed to abut against the abut surface 1e, there is no fear of the contact between the step portion 3b and the outer ring 2.

EXAMPLE 2

In FIG. 4 the bearing B is constructed by combination of the inner ring 1 and the outer ring 2. In Figure, a portion having a same portion or a same function as the first embodiment is explained by giving the same symbol and abridged the explanation thereof.

As shown in FIG. 5 and FIG. 6., the cylindrical surface 1a is formed parallel to the axial center 5 at the front side on the outer periphery of the inner ring 1, at the rear side of said cylindrical surface 1a, a taper surface 1f is formed connecting with the cylindrical surface 1a in an enlarging direction from the diameter of the cylindrical surface 1a.

The taper surface 1f if contacts slidably with a sliding surface 2f formed at the outer ring 2 at the corresponding portion thereof, thereby transmitting the thrust load applied to the axis 3 to the outer ring 2.

A cylindrical surface 1g approximately parallel to the axis 5 is formed continuing with the taper surface 1f. The cylindrical surface 1g does not contact with outer ring 2. Accordingly, the cylindrical surface 1g is not necessarily formed.

In this embodiment, the sliding surface 2f of the outer ring 2 is formed at a position of the rear end of the cylindrical surface 2a as described hereinafter. Accordingly, the position of the taper surface 1f corresponds to the sliding surface 2f, becomes a base portion 1h of the taper surface 1f which is a rising portion to the taper surface 1f from the cylindrical surface 1a of the inner ring 1. Since the base portion 1h is difficult to form it as a sharp corner at the time of formation of the inner ring 1, it is desirable to form a ring shape groove 1i at a corresponding position to the base portion 1h through all periphery of the inner ring 1.

Thus, it is possible to contact the sliding surface 2f formed at the outer ring 2 securely with the base portion 1h of the taper surface 1f by forming the ring shape groove 1i at the inner ring 1.

Further, the taper surface 1f formed at the inner ring 1 may only be formed with a dimension larger than of the surface breadth of the sliding surface 2f. For this purpose, it is possible to form the taper surface 1f between the cylindrical surface 1a and the cylindrical surface 1g as shown in FIG. 5. Further, as shown in FIG. 6, this embodiment may be constructed by forming the taper surface 1 having a sufficiently larger breadth than that of the sliding surface 2f, forming a plane 1j approximately right angle against the axial center 5 continuing with the taper surface 1f and connecting the plane 1j with the cylindrical surface 1g.

At the inner of the outer ring 2, is formed a cylindrical surface 2a having a fixed allowance with respect to the cylindrical surface 1a formed at the inner ring 1 and having an approximately equivalent length to the cylindrical surface 1a. At the rear end of the cylindrical surface 2a, the sliding surface 2f contacts with the taper surface 1f formed at the inner ring 1 is formed as shown in FIG. 7. The sliding surface 2f contacts slidably with the base portion 1h which is a part of the taper surface 1f formed at the inner ring 1 and is transmitted the thrust load applied to the axis 3 transmitted through the inner ring 1.

In other words, the plane 2b, approximately right angle to the axial axis 5 is formed connecting to the rear side of the cylindrical surface 2a. The ridged line constructed by the cylindrical surface 2a and the plane 2b is formed to be a taper shape having a taper angle equivalent to the taper surface 1f and the sliding surface 2f is formed by the taper portion. The sliding surface 2f is not limited to a taper shape, but may be formed to be a curved shape.

When the sliding surface 2f is formed a taper shape, the contact of the sliding surface 2f with the taper surface 1f formed at the inner ring 1 becomes a surface contact, while when the sliding surface 2f is formed a curved shape, the contact of the sliding surface 2f with the taper surface 1f becomes a linear contact.

A cylindrical surface 2g is formed continuing with the plane 2b. A diameter of this surface 2g has a larger dimension than that of the cylindrical surface 1g formed at the inner ring 1. Accordingly, the surface 2g is constructed so that it may not contact with the inner ring 1.

In order to construct the bearing B by the inner ring 1 and the outer ring 2 constructed above, the cylindrical surface 1a and the taper surface 1f of the inner ring 1 are engaged with the concave portion comprising the cylindrical plane 2a formed at the outer ring 2a, the plane 2b connected to the cylindrical surface 2a and the plane 2g continues to the plane 2b. By this the cylindrical surfaces 1a, 2a are allowed to contact slidably by means of the surface contact and the sliding surface 2f is allowed to contact slidably to the taper surface 1f by the plane contact or the linear contact, thereby being able to support the axis engaged with the inner ring 1.

When the axis is supported by the bearing B constructed as above, the radial load applied to the axis is transmitted to the inner ring from the journal portion, transmitted to the outer ring 2 through the cylindrical surfaces 1a, 2a and further transmitted to the machine frame from the outer ring 2 to be supported as same as in the above first embodiment. The thrust load is transmitted to the inner ring 1 through the about surface 1e from the step portion of the axis, transmitted to the outer ring 2 through the sliding surface 2f and further transmitted to the machine frame from the outer ring 2 to be supported.

EXAMPLE 3

In FIG. 8, the bearing C is constructed by the combination of the inner ring 1 and the outer ring 2.

On the outer periphery of the inner ring the inner cylindrical surface 1a is formed at the rear side of the inner ring 1 and the taper surface 1f is formed in a direction to lessen the diameter thereof toward the front side. At the inner of the outer ring 2, the cylindrical surface 2a corresponds to the cylindrical surface 1a is formed, and the plane 2b rectangular to the axial center 5 is formed connecting with the cylindrical surface 2a. Further, at the inner of the outer ring 2, the surface 2g parallel to the axial center 5 is formed connecting to the plane 2b. The sliding surface 2f is formed at the ridged line formed by plane 2b and the surface 2g as same as in the second embodiment described above. The diameter of the plane 2b is larger than that of the axial hole 4 of the inner ring 1 and smaller than that of the cylindrical surface 1a.

When the bearing C is constructed by the inner ring 1 and the outer ring 2 as described above, it is possible to support the radial load applied to the axis engaged to the axial hole 4 by the contact of the cylindrical surfaces 1a, 2a and is also possible to support the thrust load applied to the axis by the contact of the taper plane 1f and the sliding surface 2f.

Further, by designing a diameter of surface 2g formed at the outer ring 2 between the diameter of axial hole 4 and the diameter of the cylindrical surface 1a selecting optionally, pressure to the contact surface of both surfaces can be designed suitably.

In the above bearings A to C, since the inner ring 1 and the outer ring are formed by ceramics respectively, friction coefficient thereof is small and friction loss is also small. By this, at the time of supporting the axis, there is no need of the lubrication against the cylindrical surfaces 1a, and 2a, the taper surface 1f and the sliding surface 2f. Further, even when the heat due to the sliding happens, since a heat expansion coefficient of the ceramics is about 8 to $11 \times 10^{-6}$/C, an excess of thermal stress due to the heat expansion of the inner ring 1 and the outer ring 2 do not generate. Further, since the heat resistant temperature of the ceramics is about 600° C. to 1000° C., there is no fear of deterioration of the inner ring 1 and the outer ring 2 due to the above heat generation.

What is claimed is:

1. A ceramic bearing comprising:
   a one-piece ceramic inner ring defining an axial hole for fixedly receiving a shaft therein, the axial hole defining an axis, an outer periphery of the inner ring defining a cylindrical surface which is coaxial with the axis, the outer periphery further defining a taper surface extending from the cylindrical surface, the taper surface extending being coaxial with the axis and having an increasing diameter as it extends from the cylindrical surface; and,
   a one-piece ceramic outer ring having an inner periphery defining a cylindrical surface which slidably contacts the cylindrical surface of the ceramic inner ring, the inner periphery further defining a sliding surface which slidably contacts at least a part of the taper surface of the ceramic inner ring, wherein the ceramic bearing can be disassembled by relative axial displacement of the ceramic outer ring beyond an end of the ceramic inner ring.

2. A ceramic bearing comprising:
   a one-piece ceramic inner ring defining an axial hole for fixedly receiving a shaft therein, the axial hole defining an axis, an outer periphery of the inner ring defining a cylindrical surface which is coaxial with the axis, the outer periphery defining a coaxial groove at an end of the cylindrical surface, the outer periphery further defining a taper surface extending from the groove, the taper surface being coaxial with the axis and having an increasing diameter as it extends from the groove, and, a one-piece ceramic outer ring having an inner periphery defining a cylindrical surface which slidably contacts the cylindrical surface of the ceramic inner ring, the inner periphery further defining a sliding surface which slidably contacts at least a part of the taper surface of the ceramic inner ring.

3. The ceramic bearing according to claim 2, wherein the ceramic bearing can be disassembled by relative axial displacement of the ceramic outer ring beyond an end of the ceramic inner ring.

* * * * *